H. W. Millar,
Cheese Vat.
No. 109,140. Patented Nov. 8, 1870.

Witnesses:
William M. Davies
J. E. Nuttall

Inventor
Henry W. Millar.

United States Patent Office.

HENRY W. MILLAR, OF UTICA, NEW YORK.

Letters Patent No. 109,140, dated November 8, 1870.

IMPROVEMENT IN CHEESE-VATS.

The Schedule referred to in these Letters Patent and making part of the same.

*To all whom it may concern:*

Be it known that I, HENRY W. MILLAR, of the city of Utica, in the county of Oneida and State of New York, have invented certain new and useful Improvements in Heating Apparatus for Cheese-Vats, of which the following is a specification.

Nature and Objects of my Invention.

My invention relates to an arrangement of pipes within cheese-vats, and of other pipes, stop-cocks, and check-valves, in combination with a tank and a circulating heater, in such a manner that, by turning the stop-cocks one way the water in the tank, after passing through the heater, becomes warm, and returns directly into the tank, without passing into the pipes of the cheese-vats; and also in such a manner that, by turning said stop-cocks the other way, the water in the tank, after passing through the heater, becomes warmed, and, instead of directly returning to the tank, passes through the pipes of the cheese-vats, and, having been cooled by transmitting its heat through the metal of the pipes to the water lying around said pipes and between said tin and wooden vats, shall then return to the tank to be reheated for a second, third, or more journeys back through these same pipes; the objects of my invention being to obtain, whenever desired, a continuous current of water of any desired temperature through the pipes described in the foregoing first part of my invention, in order to heat the water between the wooden and tin vats, and thus heat the milk or cheese within the tin vats to any desired temperature, and by said arrangement to use the same water over and again within said pipes, in heating the water between the tin and wooden vats, and by the use of the same water to prevent deposits of scales upon any and all of the interior surfaces of the heating apparatus.

Description of Accompanying Drawing.

Figure 1:
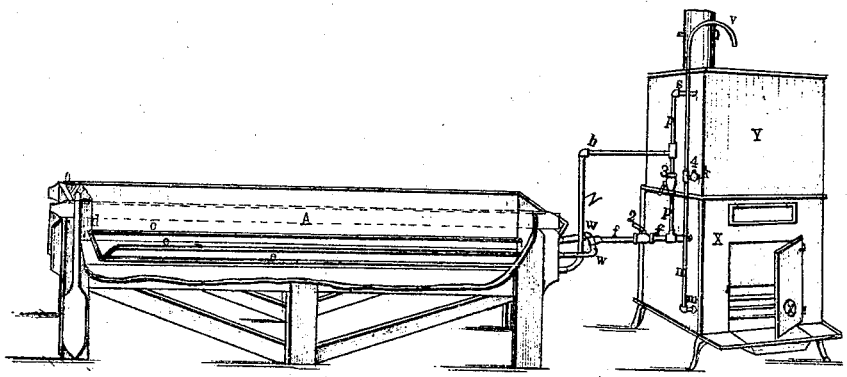

In plate 1, Figure 1 is a perspective view of my heating apparatus, with side of the wooden cheese-vat broken out, showing pipes of heating apparatus.

Figure 2:
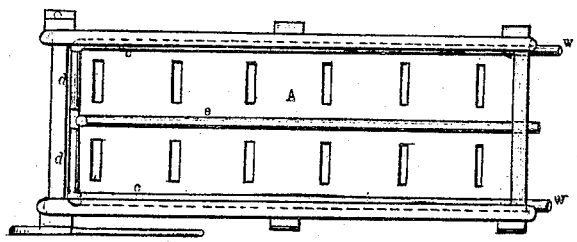

Figure 2 is a top view of the wooden cheese-vat, exhibiting pipes of the heating apparatus.

General Description.

A (see plate 1, figs. 1 and 2) is the wooden cheese-vat, within which is a tin vat.

C C are pipes running along the sides of the wooden vat A, near its bottom, and connected at one end, by means of branch pipes, with the supply-pipe $f$ of the heater.

$d\ d$ are continuations of the pipes C C, placed at the end of the vat connecting the said pipes C C with the return-pipes.

$e$ is the return-pipe, running along the center of the bottom of the vat.

A is connected at one end with the return-pipe $h$ of the tank.

X is the heater.

Y is the tank.

K is a pipe leading from the tank Y, and is connected at its outer end with the pipe $m$.

$m$ is a pipe connecting the upper end of the pipe K with the bottom of the circulating heater.

$f$ is a pipe connected with the top of the circulating heater.

P is a pipe connected at its lower end with the pipe $f$, at its middle with the pipe $h$, and at its upper end with a pipe S leading into the tank.

$w\ w$ are branch tubes connecting the pipe $f$ with the pipes C C of the vats.

Z is a branch tube connecting the pipe C of the vat with the return-pipe $h$.

A stop-cock, No. 2, is placed in pipe $f$, between where pipe P joins $f$, and when the branch tubing $w\ w$ connects with $f$ a stop-cock, 3, is placed in the pipe P, between the pipe $h$ and the pipe $f$.

A check-valve, 4, is placed in the pipe K, between the pipe $m$ and the tank Y.

V is a small pipe connected at its lower end with the pipe $m$, and having its upper end curved downward directly over the tank.

Mode of Operation.

The mode in which the first part of my invention operates is as follows. (See fig. 2.)

The tank Y is filled with water. The stop-cocks Nos. 2 and 3 (see plate) are turned so as to shut off all flow of water from the tank or heater into the pipes within the cheese-vats, and so as to permit the water to flow freely from the tank into the circulating heater, and to flow back again into the tank. A fire is then started in the circulating heater. This warms the water in the heater. This water, on being heated, rises in the heater and passes out into the pipe $f$, and, not being able to pass the stock-cock 2, flows up through the pipe P, and returns through the pipe S into the tank Y. As this water is passing up and back to the tank, a new quantity of colder water passes out through the pipe K and down through the pipe $m$ into the lower portion of heater, to take its place, and thus a constant circulation of water through the tank and heater is kept up until the water has become warmed. When thus heated the stop-cocks 2 and 3 are reversed. The warm water then passes through the heater as before, and becomes more highly heated and partially converted into steam, then passes through the heater through the pipe $f$, and, being checked by the reversed stop-cock 3, passes directly into the branch pipe $w$ $w$, and then into the pipes C C, when the steam is condensed by its contact with these cold pipes, and giving off its heat to these pipes increases their temperature. These pipes in turn communicate their heat to the water lying around them and between the tin and wooden vats. This water between said vats, on being heated, heats in turn the tin vat and the milk or curd within said tin vat. This water in the pipes C C, thus imparting its heat by conductors of metal and water to the milk or curd, passes on through the pipes $d$ $d$ and through the return-pipe $e$ to the pipe $h$. From $h$ it passes into and through the upper part of the pipe P, and then, passing through the pipe S, returns to the tank Y, to again be warmed by the heater and perform as many more similar circuits as desired. When the tin vat and its contents have become sufficiently heated the water from the heater and the tank is shut off from the vats by reversing the stop-cocks, when the water will circulate through the tank and heater.

A steam-boiler may be substituted for my present heater and tank.

I do not propose to patent the construction of the heater, as this may be of any known form for a circulating heater. Such heater may be a plain cylinder, without flues or any other complications, or it may consist of a plain cylinder with flues, or it may be constructed of pipes, or of any required form or shape, *ad infinitum*, no particular construction or form of the heater being essential to my present invention. Said invention is not for a new furnace or heater in which the heat is generated; but, after the heat is generated, it does consist in taking advantage of the circulating principle developed in water by heat—the principle that hot water rises, while the cold water descends, producing currents when confined in pipes, and in applying this heat to the water placed as a medium between the tin and wooden vat, in such a manner that, while said heat will heat all the milk in the tin vat to any and the same required degree of temperature, yet this hot water and steam from it will not mix with the water used as a medium, but is returned to the heater to be used over again, thereby preventing the heater from becoming coated with scale when hard or limy water is used, also thereby keeping the inner surface of the heater clean, and consequently rendering said heater more economical and more durable, as it is not likely to burn out.

I wish to state further that in practice it may be found desirable to place the heater below the level of the vat or vats, so that, as the heat carries the water when hottest to the highest point of circulation, (as said water is cooled by transmitting its heat to the water in the vat,) the return-pipe shall have a gradual descent toward the heater, so that the gravity of the water will aid in producing the circulation.

As regards the use of a steam-boiler, it will be readily seen that when connected to pipes arranged in a cheese-vat on the plan hereinbefore described, the steam-boiler becomes at once, and is, a circulating heater, and operates in exactly the same way, except that as no water-tank is required on top of a steam-boiler to supply it with water, it itself holding much more water than a heater made for circulation only, the return-pipe $h$ will have to be connected below the water-line, while the hot-water or steam-pipe F will be connected above the water-line. With this slight difference a steam-boiler will be connected in the same manner, operate in the same way, and be as useful as any other style of circulating heater.

Claim.

The arrangement, in relation to a cheese-vat, of the supply-pipe $f$ and supply-pipes $w$ $w$ and C C, elbow-pipes $d$ $d$, and return-pipes $e$ and Z, or their equivalents, substantially as described and for the purposes hereinbefore mentioned.

HENRY W. MILLAR.

Witnesses:
ABNER B. GARDNER,
JOHN J. DONNELLY.